Patented Aug. 17, 1937

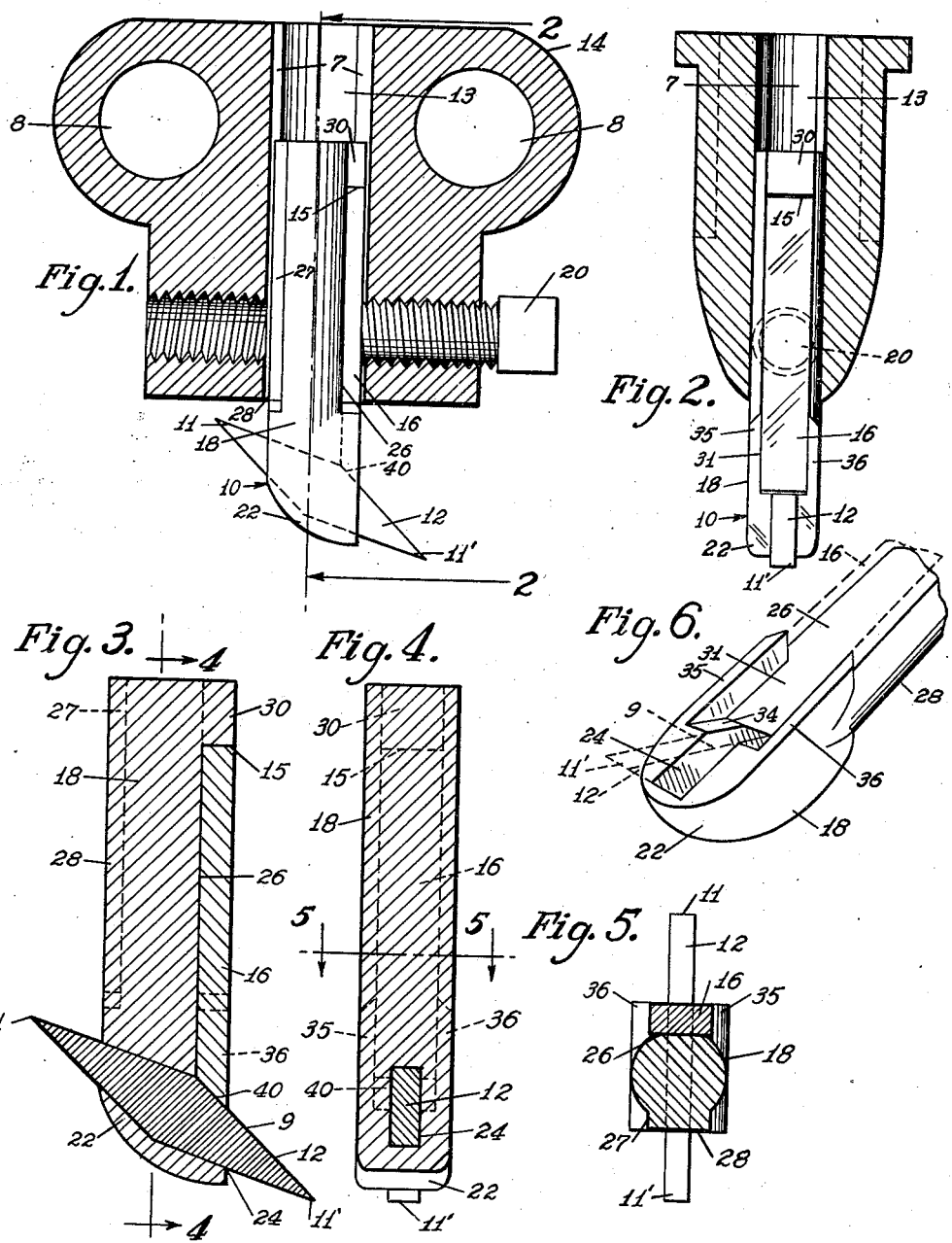

2,090,012

UNITED STATES PATENT OFFICE 2,090,012

CUTTER

Thomas M. Stephens, Michigan City, Ind.

Application August 7, 1936, Serial No. 94,737

6 Claims. (Cl. 262—33)

This invention relates to cutters and particularly to cutters of the chain type for cutting coal. Still more particularly, the invention is directed to an improved chuck and bit for chain coal cutters, and to provide a reversible bit and a simple chuck structure therefor which is rugged, simple and adapted to hold the bit rigidly.

The invention consists in the novel form and arrangement of parts to be hereinafter particularly described and claimed, and will be readily understood with reference to the annexed drawing in which:

Fig. 1 is a vertical section of a chain link assembled with a chuck and bit;

Fig. 2 is an end view of the chuck and bit with the chain link shown in section along lines 2—2 of Fig. 1;

Fig. 3 is a median section of the chuck and bit of Fig. 1;

Fig. 4 is another vertical section taken along the lines 4—4 of Fig. 3;

Fig. 5 is a lateral section of the chuck taken along lines 5—5 of Fig. 4, while

Fig. 6 is a perspective of the chuck with the key plate and bit removed.

My improved chuck 10 with a bit 12 is shown in Fig. 1 applied to a usual form of cutter-carrying link 14.

The chuck 10 comprises two parts, a key or locking plate 16, and a main body or chuck piece 18, in the form of an elongated metal body having a rounded head 22 (see Fig. 6) through which is cut a bit socket or aperture 24 tapered inwardly for the reception of a chuck of the preferred diamond shape shown in Figs. 1 and 3. The bit 12 is insertable from left to right, as in dotted lines in Fig. 6, or from right to left as in Fig. 3, the taper of the socket or aperture 24 being conformed to that of the bit 12 in the region of its cutting edges 11.

The chuck 10 is provided with front and back faces 26 and 28 respectively, both substantially flat, the front face 26 being provided as a seating surface for the key plate 16, and having a toe or boss 30 as a stop or abutment for the key plate. A slot or channel 31 is cut in the chuck body and the head 18 thereof and has a sloping end wall 34 in communication with the slot 24 and a pair of side walls 35, 36 extended longitudinally with the chuck body.

The cutting element 12 is preferably in the shape of a lozenge or diamond and is relatively thin and formed of a suitably hard tool metal with two cutting edges or points 11 and 11'. This element is insertable into the tapered slot 24 in the chuck head 18 and has the two sloping and divergent edges adjacent each point 11 pitched conformably with the taper of the aperture or cutter socket 24 to fit snugly into the latter.

The key plate 16 is an elongated metallic piece having a sloping lateral end surface 40 pitched at an angle corresponding to the slope of the end wall 34 (Fig. 6) and adapted to confront this end wall portion when the chuck and key plate are assembled as in Figs. 1, 2 particularly.

When the cutting element 12, shown in dotted lines in Fig. 6, is seated in the tapered aperture 24, one of its divergent or sloping edges 9 will lie substantially in the same plane as that of the sloping end wall 34, so that when the key plate 16 is positioned against the chuck with its end 15 abutting the chuck boss 30 and its other end in the slot or channel 31, the sloping end wall 40 will confront the sloping end wall 34 of the recess 31 and also confront the edge 9 of the cutting element 12.

The link socket 13 may suitably be provided with a key-way or longitudinal channeling 7 into which a corresponding longitudinally extensive keying ridge 27 formed in the rear face 28 of the chuck body, fits when the parts are assembled as shown in Fig. 1.

Likewise, the key plate 16 provides a similar keying ridge for the front face or part 26 of the chuck; and it will be apparent how the assembled tool, resting in the socket 13 of the link 14 as in Fig. 1, is prevented from rotating in its seat by the ridges or key parts 27 and the key plate 16 as these parts respectively are fitted into the key-ways or channels 7 in the socket 13.

Operation

My improved cutting tool is adapted particularly for use with coal cutting chains of the type having a plurality of links 14 (Fig. 1) having tool-receiving sockets 13 and a tool securing means such as the bolt 20 threaded therein. Such links are interlinked with other chain members by means of pins or the like extended through the holes 8.

When it is desired to apply a cutting tool to a link, a newly sharpened cutting element or bit 12 may be dropped into the tapered slot 24 in the head portion 22 of the chuck 18. At this juncture, Fig. 6 with the cutter 12 shown in dotted lines, would be representative of the assembly thus far. Thereafter, the key plate or locking member 16 is applied by laying the wedge shaped end thereof into the recess or channel 31, while the other end 15 will abut the boss 30. In this condition, the sloping lateral face 40 of the wedge end of the key plate 16 will lie against the sloping edge of the cutter 12.

Having thus assembled the chuck, bit, and key plate, the assembly is inserted in the socket 13 of link 14 and the locking bolt 20 screwed up against the key plate as shown in Fig. 1, thus firmly securing the bit in the chuck and at the same time securing the whole tool in the link 14. When it is desired to change the cutting edge, it is merely necessary to reverse the process just described, turn the cutter 12 around, and again tighten bolt 20. Also the direction of the cutter 12 may be conformed to the direction of movement of the chain by turning the tool around in socket 13, and for this purpose the link is threaded for the locking bolt 20 as shown in Fig. 1.

It will thus be apparent that I have provided a novel and simple cutting tool applicable to coal cutting chains and the like and characterized by the fact that the tool can very readily be assembled and disassembled to renew or reverse the cutting element, and the means used for securing the chuck in the chain link also holds the bit rigidly in the tool.

The tool, among its other advantages, makes it unnecessary to resharpen the cutting elements, and these may be thrown away as they become dull, my improved structure making it possible and desirable to follow such practice because of the facility with which the cutters can be interchanged and because the structure of the tool makes it possible to use small, inexpensive cutter elements, and while I have described my novel cutting tool in detail, I do not wish to be limited to such details, but desire to avail myself of all the variations, modifications and uses of the invention coming within the appended claims which I desire to protect by Letters Patent of the United States.

I claim:

1. A cutting tool for cutting chains having cutting tool sockets, the said tool comprising an elongated chuck having a tapered aperture therethrough, a recessed portion in communication with one open extremity of said aperture, a boss spaced away from said recessed portion, a tapered cutting element in said aperture, and a key plate positioned in said recessed portion and against said boss and cutting element to lock the same in said chuck, the said tool being receivable in said cutting chain socket.

2. A cutting tool for use with chain type cutting mechanisms comprising: an elongated chuck having a cutting element aperture therethrough and a slotted portion in communication with said aperture; a boss spaced away from said slot; a cutting element seated in said aperture; a locking member seated in said slot and having an end portion in abutment with said boss and an end portion adapted to bear against said cutting element; and means for supporting the said chuck and locking member in a cutting chain, said means including a link member having a socket portion and screw means for securing said locking member and chuck in operative relation therein.

3. A cutting tool for insertion in cutting chains having links with tool sockets therein, the said tool comprising an elongated chuck having an apertured end portion, a key plate slot in a side of said chuck and communicating with said aperture, a boss spaced from said slot in a direction away from said apertured end, a cutting element receivable in said apertured portion of said chuck, and a key member in said slot and having a portion in abutment with said boss to lock said cutting element in said chuck when the said key plate and chuck are held in assembled relation as aforesaid in said tool socket.

4. A cutting tool for mining machines and the like, comprising a cutter chain link having a cutter socket with a key channel therein and screw means for securing a cutting tool in said socket, and a cutter tool comprising an elongated chuck having a key portion receivable in said key channel, and a tapered transversely slanted aperture at one end thereof, a tapered cutter seated in said aperture, a boss spaced away from said tapered aperture toward the opposite end of said chuck, said chuck having cut-away side portions in communication with said aperture, and a wedge plate positioned against said chuck so as to have an end portion in abutment with said boss and an opposite end portion in the said cut-away portions of the chuck and bearing against said cutter to prevent removal of the same from the chuck, the said chuck and wedge plate being inserted in said cutter socket in the link in such manner that the said wedge plate and chuck will be firmly held in the aforesaid operative relation by said screw means.

5. A cutting tool for mining machines of the chain type, said tool comprising a link adapted for insertion in a mining chain and having a tool receiving socket therein and means for clamping a tool in said socket, together with a cutter comprising an elongated chuck having adjacent one end thereof a transversely directed tapered aperture, a side of said chuck being cut away between said aperture and the opposite end of the chuck, the latter having a boss formed at said opposite end and terminating said cut away portion, and an elongated locking wedge fitted into said cut away portion of the chuck with one end abutting said boss and its opposite end bearing against a tapered cutting element seated in said aperture, said chuck and locking wedge being held in assembled relation in said socket in the link.

6. A cutting tool for mining machines of the chain cutter type having a cutting chain provided with a link having a tool receiving socket with oppositely disposed longitudinal grooves, said cutting tool comprising an elongated chuck adapted to fit in said socket and having a longitudinal key formation receivable in one of said grooves in the socket, said chuck further having a transversely directed tapered aperture adjacent one end thereof and said aperture having its largest opening on the side of said chuck opposite to said key formation, said chuck having a recess communicating with said largest aperture opening and having a boss at its end opposite said aperture and opposite said key formation, said tool further including a tapered cutting element fitted into said aperture in the chuck and having an edge surface exposed in said recess communicating with said aperture, and an elongated locking plate fitted against said chuck between said boss and said recess, said plate having an angled edge portion fitting closely against the exposed edge portion of said cutting element in said recess, said chuck and locking plate being fitted into said socket in the chain link and said boss and locking plate being dimensioned to fit into the one of said grooves opposite the groove in which said key formation is received.

THOMAS M. STEPHENS.